(12) United States Patent
Matsunaga et al.

(10) Patent No.: US 12,432,459 B2
(45) Date of Patent: Sep. 30, 2025

(54) IMAGE SENSOR TO SUPPRESS FLICKER (71) Applicant: OmniVision Technologies, Inc., Santa Clara, CA (US)

(72) Inventors: Yoshiyuki Matsunaga, Kyoto (JP); Keiji Mabuchi, Cupertino, CA (US); Lindsay Grant, Campbell, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 114 days.

(21) Appl. No.: 18/507,301

(22) Filed: Nov. 13, 2023

(65) Prior Publication Data

US 2025/0159372 A1 May 15, 2025

(51) Int. Cl.
*H04N 23/745* (2023.01)
*H04N 25/65* (2023.01)
*H04N 25/77* (2023.01)
*H04N 25/771* (2023.01)

(52) U.S. Cl.
CPC .......... *H04N 23/745* (2023.01); *H04N 25/65* (2023.01); *H04N 25/77* (2023.01); *H04N 25/771* (2023.01)

(58) Field of Classification Search
CPC ...... H04N 23/745; H04N 25/65; H04N 25/77; H04N 25/771
See application file for complete search history.

(56) References Cited

U.S. PATENT DOCUMENTS

| | | | |
|---|---|---|---|
| 6,046,444 A * | 4/2000 | Afghahi ............... | H04N 25/771 348/E3.019 |
| 6,201,270 B1 * | 3/2001 | Chen .................... | H10F 39/803 327/515 |
| 8,207,485 B2 * | 6/2012 | LePage ................. | H04N 25/59 257/292 |
| 11,196,947 B2 | 12/2021 | Ni | |

* cited by examiner

*Primary Examiner* — Lin Ye
*Assistant Examiner* — Chriss S Yoder, III (57) ABSTRACT

An image sensor includes: a photodiode configured to be reset for each one frame period, to accumulate charges corresponding to incident light for one frame period, and to output an output voltage corresponding to the accumulated charges; and a holding capacitor configured to accumulate charges corresponding to an output signal of the photodiode. The output signal of the photodiode for one frame is integrated, the integrated output signal is accumulated in the holding capacitor, and a first signal is output. After the holding capacitor is refreshed, a voltage corresponding to the output voltage of the photodiode is held in the holding capacitor, and a second signal is output.

10 Claims, 11 Drawing Sheets

Fig. 11 ent does not limit the present disclosure, and configurations obtained by selectively combining a plurality of illustrations are also included in the present disclosure.

IMAGE SENSOR TO SUPPRESS FLICKER

TECHNICAL FIELD

The present disclosure generally relates to an image sensor using a photodiode that can perform appropriate operation both at low illuminance and at high illuminance.

BACKGROUND INFORMATION

An image sensor includes a photodiode in each of pixel circuits, and detects a charge amount generated based on light entering each of the photodiodes.

Figure 1:
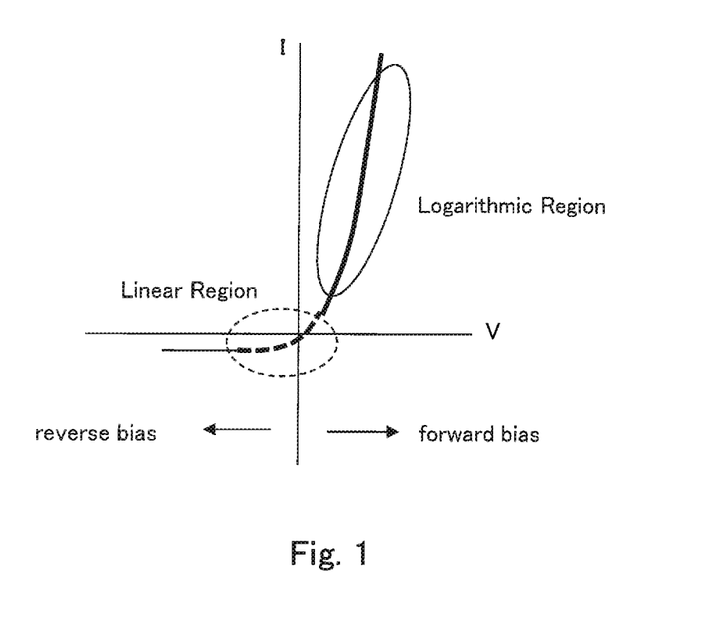
FIG. 1 is a diagram illustrating VI characteristics of a photodiode.

FIG. 1 is a diagram illustrating VI characteristics of one photodiode. As illustrated, the VI characteristics of the photodiode have a logarithmic region (at high illuminance) where the photodiode operates with a forward bias, and a linear region (at low illuminance) where the photodiode operates with a reverse bias and a part of the forward bias.

Therefore, operation of the photodiode is different between conditions of high illuminance and low illuminance. Accordingly, property of noise mixed at detection is also different between conditions of high illuminance and low illuminance. Thus, the noise is desirably appropriately removed both at high illuminance and at low illuminance.

An example has disclosed integration of the output of the photodiode in order to remove flicker caused by LED lighting, although without the discussion of the kTC noise.

SUMMARY

An image sensor according to the present disclosure includes: a photodiode configured to be reset for each one frame period, to accumulate charges corresponding to incident light for one frame period, and to output an output voltage corresponding to the accumulated charges; and a holding capacitor configured to accumulate charges corresponding to an output signal of the photodiode. The output signal of the photodiode for one frame period is integrated, the integrated output signal is accumulated in the holding capacitor, and a first signal is output. After the holding capacitor is refreshed, a voltage corresponding to the output voltage of the photodiode is held in the holding capacitor, and a second signal is output.

According to the present disclosure, the first signal and the second signal may be obtained during one frame period. This may make it possible to obtain the output in which flicker is suppressed both at low light and at high light.

BRIEF DESCRIPTION OF THE DRAWINGS

Embodiments of the present disclosure will be described based on the following figures, wherein.

DESCRIPTION OF EMBODIMENTS

An embodiment of the present disclosure is described below with reference to drawings. The following embodiment does not limit the present disclosure, and configurations obtained by selectively combining a plurality of illustrations are also included in the present disclosure.

Circuit Configuration

Figure 2:
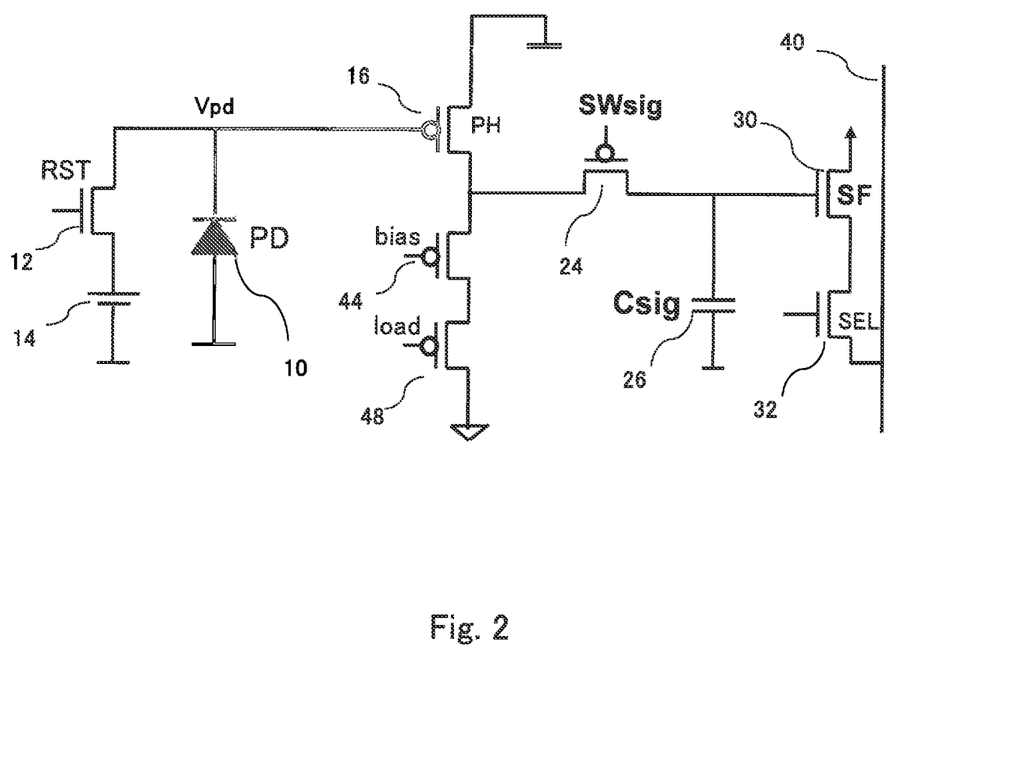
FIG. 2 is a diagram illustrating a configuration of a pixel circuit of an image sensor according to an embodiment.

FIG. 2 is a diagram illustrating a configuration of a pixel circuit of an image sensor according to the embodiment. A photodiode (PD) 10 accumulates charges (electrons in this case) based on incident light. A cathode of the photodiode (PD) 10 serves as an output end, and anode is connected to a power supply (e.g., ground). Accordingly, an output voltage Vpd of the photodiode (PD) 10 becomes an output signal. In the present embodiment, a field effect transistor (FET) is used as a transistor.

One end (drain) of a reset transistor (RST) 12 is connected to the cathode of the photodiode (PD) 10, and the other end (source) of the reset transistor (RST) 12 is connected to a power supply (e.g., ground) through a reset power supply 14. In this example, the reset transistor (RST) 12 is an n-channel transistor.

The cathode of the photodiode (PD) 10 is connected to a gate of a peak hold transistor (PH) 16. The peak hold transistor (PH) 16 is a p-channel transistor. A source of the peak hold transistor (PH) 16 is connected to a power supply.

A source of a switch transistor (SWsig) 24 is connected to a drain of the peak hold transistor (PH) 16. One end of a holding capacitor (Csig) 26 is connected to a drain of the switch transistor (SWsig) 24. The other end of the holding capacitor (Csig) 26 is connected to a power supply (e.g., ground). The switch transistor (SWsig) 24 is a p-channel transistor.

The drain of the switch transistor (SWsig) 24 is connected to a gate of a source follower transistor (SF) 30. A drain of the source follower transistor (SF) 30 is connected to a power supply, and a source is connected to a drain of a selection transistor (SEL) 32. A source of the selection transistor (SEL) is connected to an output line 40.

Further, the drain of the peak hold transistor (PH) 16 is connected to a power supply (e.g., ground) through a bias transistor (bias) 44 and a load transistor (load) 48. The bias transistor (bias) 44 and the load transistor (load) 48 are p-channel transistors.

A gate voltage of the load transistor (load) 48 is set to a direct-current voltage at which the peak hold transistor (PH) 16 performs source follower operation. To inject holes into the holding capacitor (Csig) 26, a negative pulse is applied to the bias transistor (bias) 44.

A row selection signal is supplied to a gate of the selection transistor (SEL) 32. When the row selection signal becomes an H level, a signal corresponding to a gate voltage of the source follower transistor (SF) 30 is output to the output line 40.

The source follower transistor (SF) 30 and the selection transistor (SEL) 32 are n-channel transistors. The source follower transistor (SF) 30 is referred to as an output transistor, and the gate thereof is referred to as a control end.

Figure 3:
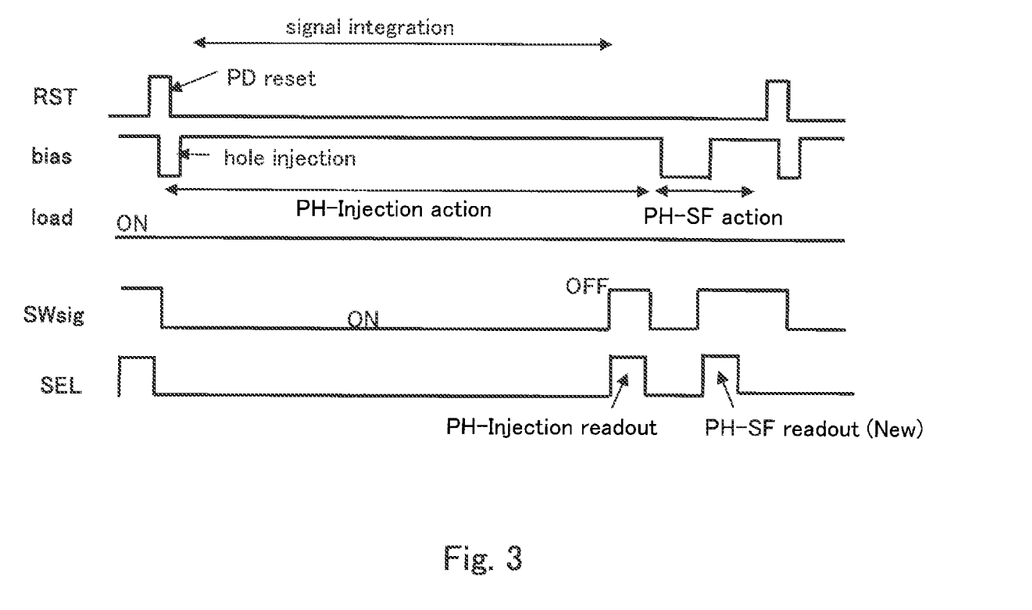
FIG. 3 is a timing chart illustrating operation of the circuit in FIG. 2.

FIG. 3 is a timing chart illustrating operation of the circuit in FIG. 2. The charges (holes) are injected into the holding capacitor (Csig) by turning on the reset transistor (RST) 12 to reset the photodiode (PD) 10 and then turning on the bias transistor (bias) 44 and the switch transistor (SWsig).

Thereafter, the bias transistor (bias) is turned off to discharge excess charges through the peak hold transistor (PH) 16. As a result, the holding capacitor (Csig) 26 is put into a reset state. In this state, a signal supplied from the peak hold transistor (PH) 16 is accumulated in the holding capacitor (Csig) 26 through the switch transistor (SWsig) for one frame period. As described above, the output voltage corresponding to the accumulated charges of the photodiode (PD) 10 is supplied to the gate of the peak hold transistor (PH) 16. Therefore, the charges corresponding to an incident light amount of the photodiode (PD) 10 for one frame period are accumulated in the holding capacitor (Csig) 26.

When the switch transistor (SWsig) is turned off and the selection transistor (SEL) 32 is turned on, the voltage signal corresponding to the charges accumulated in the holding capacitor (Csig) 26 is read out to the output line 40. The readout signal is referred to as a PH-injection signal or a first signal in this example.

Thereafter, in a state where the bias transistor is on, the peak hold transistor (PH) 16 is caused to operate as a source follower circuit, and a signal corresponding to the output voltage of the photodiode (PD) 10 is accumulated in the holding capacitor (Csig) 26. In other words, the charges corresponding to the output voltage of the photodiode (PD) 10 at that time are accumulated in the holding capacitor (Csig) 26. Thereafter, the switch transistor (SWsig) 24 is turned off, the selection transistor (SEL) 32 is turned on, and the signal accumulated in the holding capacitor (Csig) 26 is read out to the output line 40. The signal is referred to as a PH-SF signal or a second signal.

Occurrence of Flicker

Figure 4:
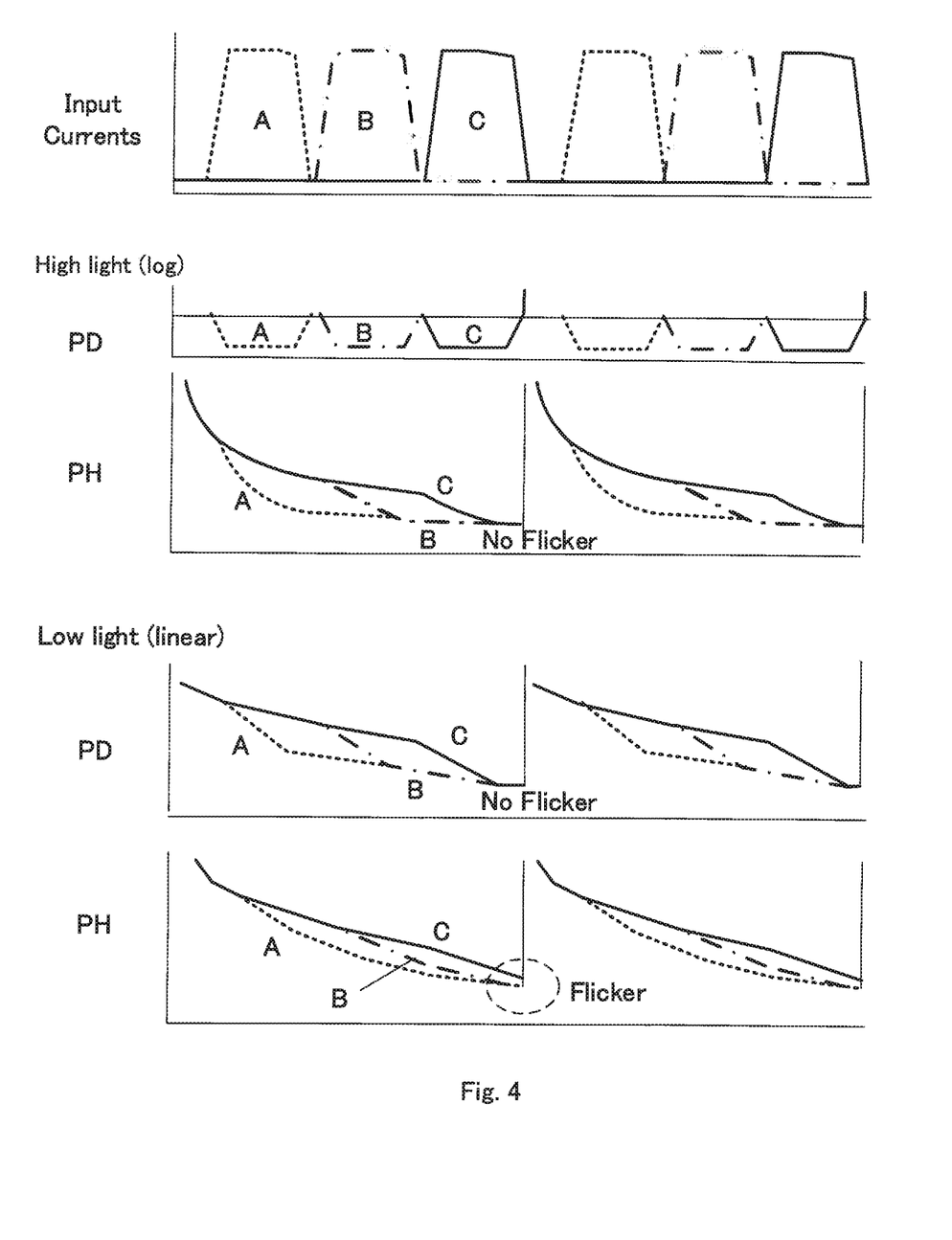
FIG. 4 is a diagram illustrating a flicker occurrence state.

FIG. 4 illustrates a flicker occurrence state. An upper stage illustrates an input current corresponding to the incident light amount. In this example, a case of three incidences at different timings, namely, A incidence during first ⅓ of the period of one frame, B incidence during middle ⅓ of the period of one frame, and C incidence during last ⅓ of the period of one frame is illustrated.

A middle stage illustrates the output of the photodiode (PD) 10 and the output of the peak hold transistor (PH) 16 (voltage PH accumulated in holding capacitor (Csig) 26) in a case where illuminance is relatively high and the incident light amount is high (high light).

As illustrated, in the case of high light, the output voltage of the photodiode (PD) 10 has the same behavior as intensity of incident light. Therefore, the output voltage of the photodiode (PD) 10 at the end of one frame is varied by the incident timing. On the other hand, a value integrated in the peak hold (PH) circuit is fixed even when light enters at any timing of one frame.

A lower stage illustrates the output of the photodiode (PD) 10 and the output of the peak hold transistor (PH) 16 (voltage PH accumulated in holding capacitor (Csig) 26) in a case where the incident light amount is relatively small (low light).

As illustrated, in the case of low light, integration is performed in the photodiode (PD) 10. Therefore, flicker does not occur in the output of the photodiode (PD) 10.

However, when integration is performed again in the peak hold circuit, flicker occurs. In other words, in a case where light enters at the beginning of one frame, the voltage is held even when the incident light disappears after signal integration, and an integration signal is increased. In contrast, in a case where light enters at the end of one frame, the signal is not integrated at the beginning of one frame, and is integrated only at the end of one frame. In the lower stage, the signal of light entering at the end of one frame is small.

Figure 5:
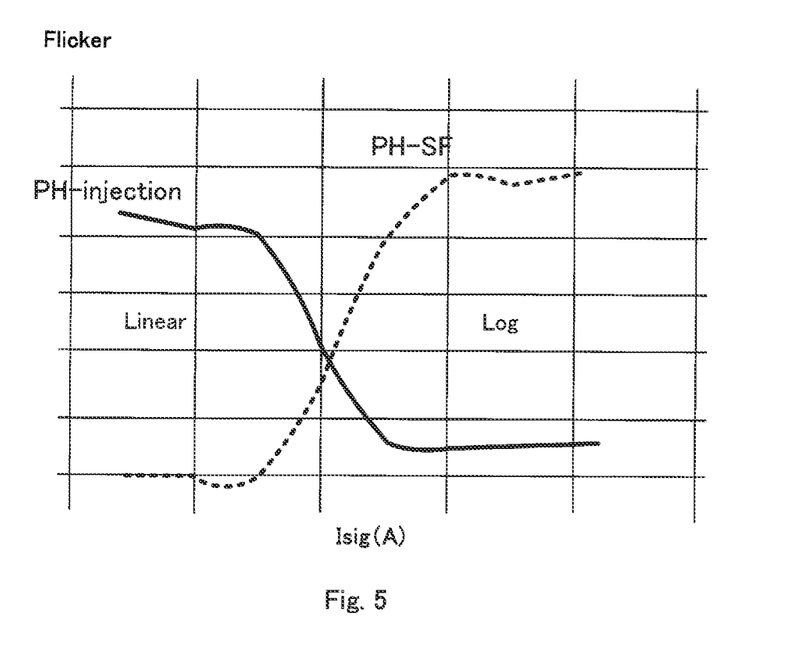
FIG. 5 is a diagram illustrating a magnitude of a signal Isig as an output of a photodiode (PD) 10, and an occurrence frequency of flicker in a PH-injection signal and in a PH-SF signal.

FIG. 5 is a diagram illustrating a magnitude of the signal Isig as the output of the photodiode (PD) 10, and an occurrence frequency of flicker in the PH-injection signal and in the PH-SF signal.

As illustrated, in the PH-injection signal, flicker occurs due to double integration in the linear region where the signal Isig is small, whereas flicker is suppressed by integration in the peak hold (PH) circuit in the logarithmic region where the signal Isig is large. On the other hand, in a case of the PH-SF signal causing the peak hold (PH) circuit to operate as the source follower (SF) circuit, flicker occurs due to variation of the output in the logarithmic region where the signal is large, whereas flicker does not occur in the linear region where the signal is small, because the signal corresponding to the output of the photodiode PD is output.

In the present embodiment, flicker caused by double integration is suppressed by using the PH-injection signal in the logarithmic region where the signal is large, and using the PH-SF signal in the linear region where the signal is small. This makes it possible to suppress flicker in all of the regions.

Configuration of Image Sensor

Figure 6:
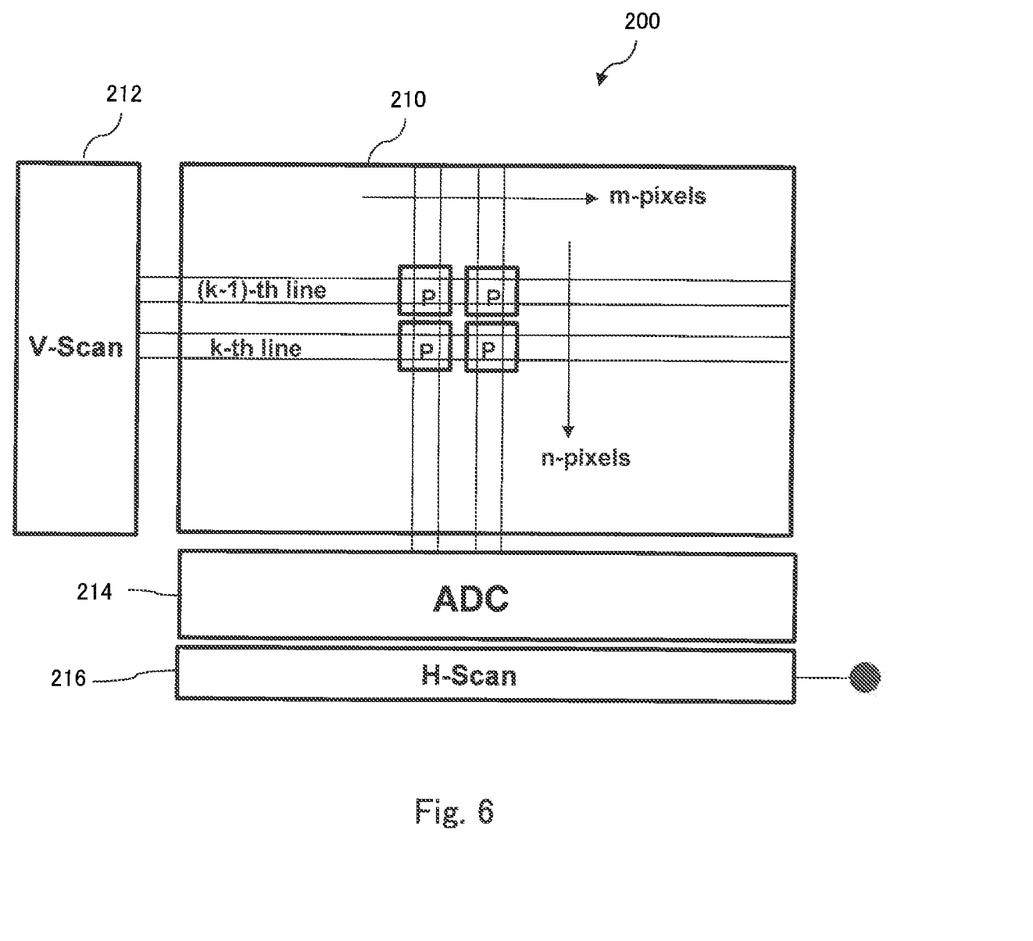
FIG. 6 is a diagram illustrating an image sensor 200 in which pixels according to the embodiment are two-dimensionally arranged.

FIG. 6 is a diagram illustrating an image sensor 200 in which the pixels according to the embodiment are two-dimensionally arranged. A pixel array 210 includes pixels P as described above arranged in m columns*n rows (m*n), namely, includes m pixels in a horizontal direction and n pixels in a vertical direction. A vertical scan circuit (V-Scan) 212 sequentially selects rows of the pixels P in the vertical direction. The pixels in each column are connected to an analog-to-digital converter (ADC) 214 by a readout line in the vertical direction. A horizontal scan circuit (H-Scan) 216 is connected to the analog-to-digital converter (ADC) 214, and image signals of the respective pixels are sequentially output from the horizontal scan circuit (H-Scan) 216.

Figure 7:
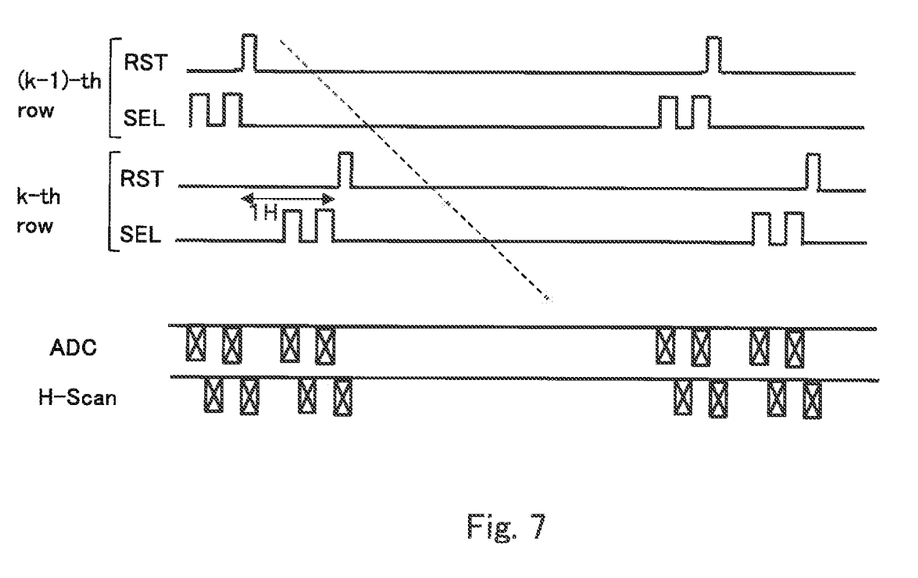
FIG. 7 is a timing chart illustrating operation of the image sensor 200.

FIG. 7 is a timing chart illustrating operation of the image sensor 200.

In a (k−1)-th row, after two readouts end, the reset transistor (RST) 12 is turned on to reset the photodiode (PD) 10. The reset is performed for each vertical period (1V). Exposure starts after one reset. In addition, first readout of the signal is performed shortly before next reset. The readout is performed in the above-described manner such that the selection transistor (SEL) 32 is turned on, and the PH-injection signal accumulated in the holding capacitor (Csig) 26 is read out to the analog-to-digital converter (ADC) 214 through the output line 40. The analog-to-digital converter (ADC) 214 converts the PH-injection signal into a digital signal. Here, bias pulses and SWsig pulses in FIG. 3 are omitted for simplicity.

Next, as described above, the PH-SF signal is formed in the holding capacitor (Csig) 26, the selection transistor (SEL) 32 is turned on to read out the PH-SF signal to the analog-to-digital converter (ADC) 214, and the PH-SF signal is converted into a digital signal.

The analog-to-digital converter (ADC) 214 selects either the PH-injection signal or the PH-SF signal based on magnitudes of the signals. For example, any one of the PH-injection signal and the PH-SF signal is compared with a predetermined threshold. In a case where the signal is greater than the predetermined threshold, the PH-SF signal is selected. In a case where the signal is less than the predetermined threshold, the PH-injection signal is selected. It is also possible to use a signal that is the sum of the PH injection signal and the PH-SF signal.

As described above, in a case where the signals for the respective pixels are prepared, the horizontal scan circuit (H-Scan) 212 sequentially outputs the signals for the m pixels.

Next, in a k-th row, the same operation is performed by shifting the horizontal period by 1H. Signals of all of the m*n pixels can be read out by repeating the operation n times.

Note that selection of the PH-injection signal or the PH-SF signal can be performed by the ADC 214 as described above. Alternatively, the two signals may be output to outside from the image sensor 200, and the operation may be performed by an external circuit.

Modification 1

Figure 8:
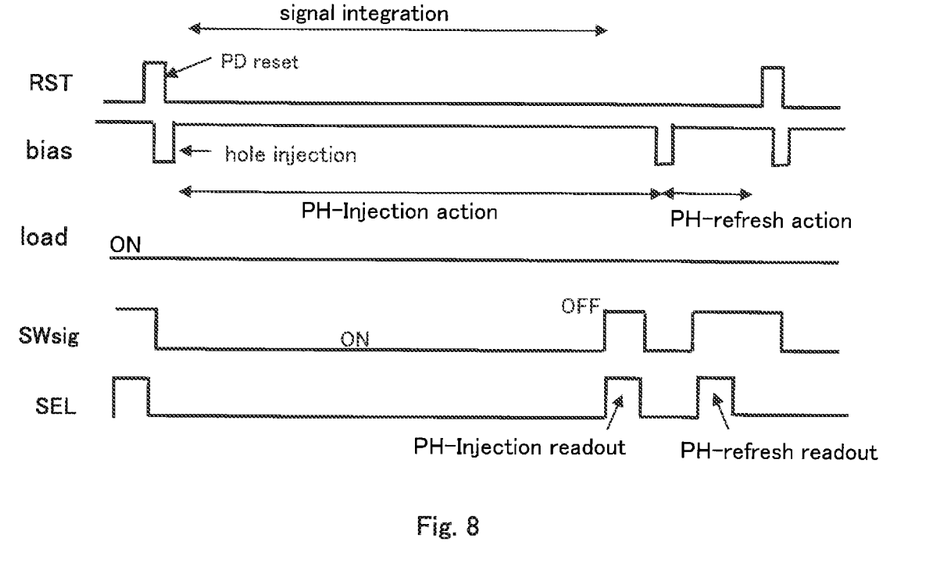
FIG. 8 is a timing chart illustrating operation according to a modification 1.

A circuit configuration according to a modification 1 is as illustrated in FIG. 2. FIG. 8 is a timing chart illustrating operation according to the modification 1.

The gate voltage of the load transistor 48 is set to the direct-current voltage at which the peak hold transistor (PH) 16 performs the source follower operation.

In the modification 1, after first readout of the PH-injection signal ends, the switch transistor (SWsig) is turned on, and in this state, the bias transistor (bias) 44 is set to the H level for a short period. The peak hold transistor (PH) 16 performs the source follower operation, injects the holes into the holding capacitor (Csig) through the switch transistor (SWsig) 24, and discharges excess holes. As a result, the peak hold circuit is refreshed, and the holding capacitor (Csig) 26 is refreshed to a voltage corresponding to the output voltage of the photodiode (PD) 10.

Thereafter, the switch transistor (SWsig) 24 is turned off, and the selection transistor (SEL) 32 is turned on to read out the signal. The signal is referred to as a PH-refresh signal. In addition, the PH-refresh signal is also referred to as a second signal.

Modification 2

Figure 9:
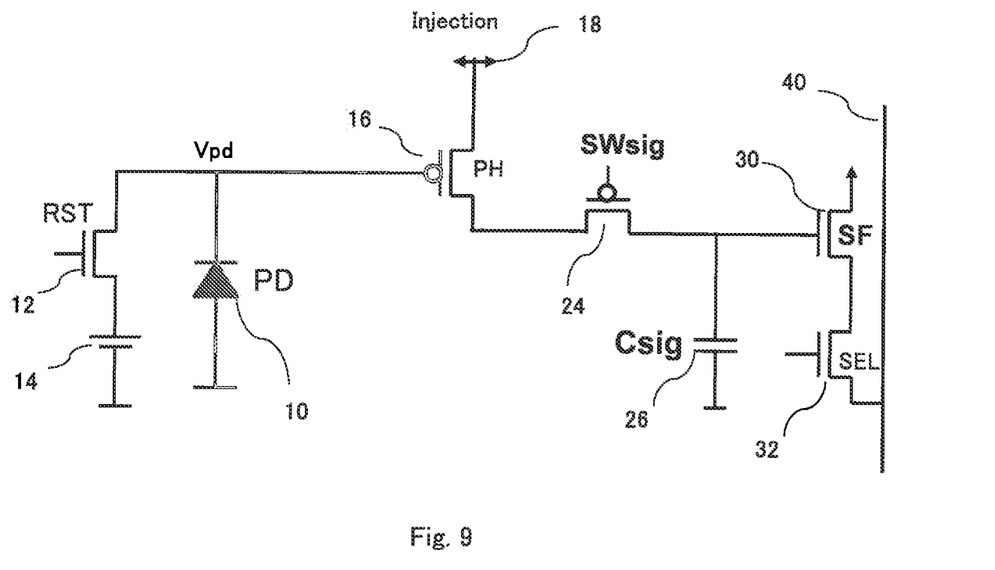
FIG. 9 is a diagram illustrating a circuit configuration according to a modification 2.

FIG. 9 is a diagram illustrating a circuit configuration according to a modification 2. As illustrated, the source of the peak hold transistor (PH) 16 is connected to an injection power supply 18, and only the source of the switch transistor (SWsig) is connected to the drain of the peak hold transistor (PH) 16.

In the modification 2, the holes can be injected into and discharged from the holding capacitor (Csig) 26 by applying a pulse voltage to the source of the peak hold transistor (PH).

Figure 10:
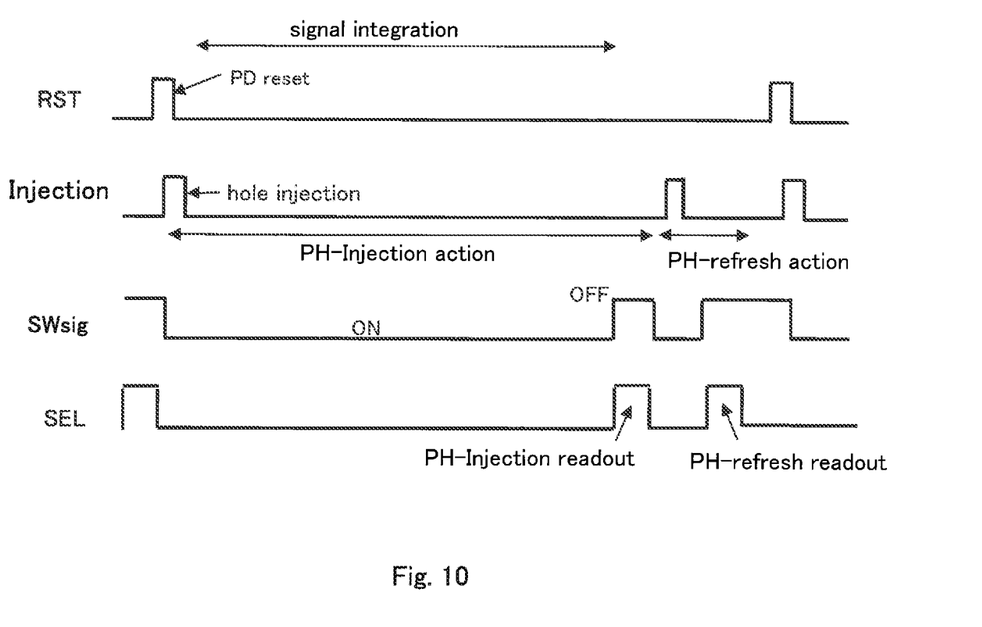
FIG. 10 is a timing chart illustrating operation according to the modification 2.

FIG. 10 is a timing chart illustrating operation according to the modification 2. After the photodiode (PD) 10 is reset, the injection power supply 18 is set to the H level, and the holes are injected into the holding capacitor (Csig) 26 through the peak hold transistor (PH) 16 and the switch transistor (SWsig) 24. Thereafter, the injection power supply 18 is set to the L level, and excess holes are discharged through the peak hold transistor (PH) 16.

Thereafter, the switch transistor (SWsig) 24 is turned off, and the selection transistor (SEL) 32 is turned on to read out the PH-injection signal.

Subsequently, the injection power supply 18 is set to the H level for a short period to inject the holes. The PH circuit is refreshed by discharging excess holes, and the signal is stored in the holding capacitor (Csig). The voltage of the holding capacitor (Csig) 26 after the refresh corresponds to the gate voltage of the peak hold transistor (PH) 16, namely, to the output voltage of the photodiode (PD) 10 at that time. Thus, the switch transistor (SWsig) 24 is turned off, and the selection transistor (SEL) 32 is turned on, which makes it possible to read out the signal. The readout signal is referred to as a PH-refresh signal.

As described above, in the modification 2, the PH circuit is caused to operate as the refresh circuit at the time of second readout. In the case of the PH-refresh signal, flicker occurs in the logarithmic region where the signal is large, but flicker is eliminated in the linear region where the signal is small.

Accordingly, when the PH-refresh signal is used in the linear region and the PH-injection signal is used in the logarithmic region, it is possible to suppress flicker in all of the regions.

Other Effects

Generally, double integration of the signal lowers the signal level. More specifically, in the case where the incident light enters at the beginning of one frame, the signal is integrated. Therefore, the voltage is held even after the incident light disappears, and the integration signal is increased. In contrast, in the case where the incident light enters at the end of one frame, the signal is not integrated from the beginning of one frame, and is corresponded to the PD signal at the end of one frame. This indicates that the signal level of light C in FIG. 4 entering at the end of one frame is lowered.

Figure 11:
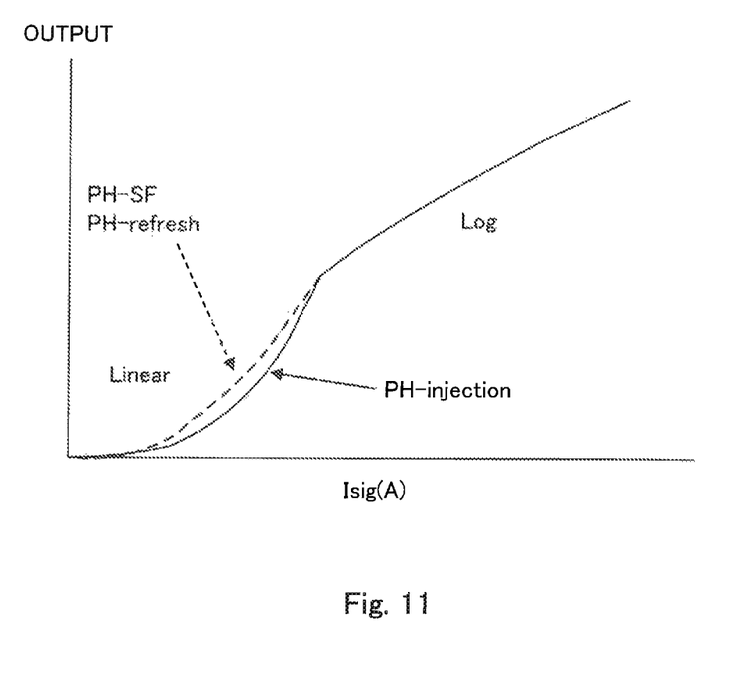
FIG. 11 is a diagram illustrating a result obtained by comparing outputs of three signals in a case where a constant amount of light enters during one frame period.

FIG. 11 is a diagram illustrating a result obtained by comparing outputs of the three signals in a case where a constant amount of light enters during one frame period. The PH-SF signal and the PH-refresh signal have the same characteristics in the entire range. On the other hand, it is found that output of the PH-injection signal is deteriorated by about 0.66 times in the linear region as compared with the PH-SF signal and the PH-refresh signal.

According to the present embodiment, the PH-SF signal or the PH-refresh signal is used in the linear region. Therefore, it is possible to avoid influence of deterioration of the PH-injection signal in the above-described linear region.

What is claimed is:
1. A pixel circuit of an image sensor, comprising:
 a photodiode, wherein an anode of the photodiode is connected to ground;
 a reset transistor, wherein a drain of the reset transistor is connected to a cathode of the photodiode, a source of the reset transistor is connected to ground through a reset power supply, and a gate of the reset transistor is coupled to receive a reset control signal;
 a peak hold transistor, wherein a gate of the peak hold transistor is connected the cathode of the photodiode and a source of the peak hold transistor is connected to a power supply;
 a switch transistor, wherein a source of the switch transistor is connected to a drain of the peak hold transistor and a gate of the switch transistor is connected to receive a switch control signal;

a holding capacitor, wherein a first end of the holding capacitor is connected to a drain of the switch transistor and a second end of the holding capacitor is connected to ground;

a source follower transistor, wherein a gate of the source follower transistor is connected to the drain of the switch transistor and a drain of the source follower transistor is connected to the power supply;

a selection transistor, wherein a drain of the selection transistor is connected to a source of the source follower transistor, a source of the selection transistor is connected to an output line, and a gate of the selection transistor is coupled to receive a row selection signal;

a bias transistor, wherein a source of the bias transistor is connected to the drain of the peak hold transistor;

a pulse voltage supply connected to a gate of the bias transistor; and a load transistor, wherein a source of the load transistor is connected to a drain of the bias transistor, a drain of the load transistor is connected to ground, and a gate of the load transistor is coupled to receive a direct-current load control voltage.

2. The pixel circuit of the image sensor of claim 1, wherein the reset transistor is an n-channel field effect transistor, the peak hold transistor and the switch transistor are p-channel field effect transistor, the source follower transistor and the selection transistor are n-channel field effect transistor, and the bias transistor and the load transistor are p-channel field effect transistors.

3. A method of operating a pixel circuit of the image sensor according to claim 1, the method comprising:

maintaining the row selection signal to a first low voltage to keep the selection transistor at an off state;

maintaining the direct-current load control voltage to the gate of the load transistor to allow the peak hold transistor to perform source follower operation;

maintaining the switch control signal to a high voltage to keep the switch transistor off;

applying a positive pulse to the gate of the reset transistor to reset accumulated charges of the photodiode for one frame period;

setting the switch control signal to a second low voltage to turn the switch transistor on;

applying a first negative pulse to the gate of the bias transistor to inject holes into the holding capacitor;

turning the bias transistor off to discharge excess charges through the peak hold transistor;

putting the holding capacitor into a reset state to accumulate an integrated charges of the photodiode corresponding to an incident light from the gate of the peak hold transistor to the holding capacitor through the switch transistor for one frame period;

turning the switch transistor off and then turning the selection transistor on to read an integrated PH-Injection signal from the holding capacitor to the output line;

turning the selection transistor off followed by turning the switch transistor on to refresh the holding capacitor;

applying a second negative pulse to the gate of the bias transistor to operate the peak hold transistor as a source follower circuit to accumulate the charges corresponding to the output voltage of the photodiode during the second negative pulse period in the holding capacitor; and turning the switch transistor off and then turning the selection transistor on to read an PH-SF signal from the holding capacitor to the output line.

4. The method of operating the pixel circuit of the image sensor of claim 3, wherein the photodiode generates charges corresponding to the incident light and is operable in both a linear region and a logarithmic region.

5. The method of operating the pixel circuit of the image sensor of claim 3, wherein if determined that one of the PH-injection signal and the PH-SF signal is greater than a predetermined threshold, the PH-injection signal is selected in the logarithmic region to suppress flicker, wherein if determined that one of the PH-injection signal and the PH-SF signal is less than the predetermined threshold, the PH-SF signal is selected in the linear region to suppress flicker, and wherein it is also possible to use a signal that is the sum of the PH injection signal and the PH-SF signal.

6. A pixel circuit of an image sensor, comprising:

a photodiode, wherein an anode of the photodiode is connected to ground;

a reset transistor, wherein a drain of the reset transistor is connected to a cathode of the photodiode, a source of the reset transistor is connected to ground through a reset power supply, and a gate of the reset transistor is coupled to receive a reset control signal;

a peak hold transistor, wherein a gate of the peak hold transistor is connected the cathode of the photodiode;

an injection power supply, wherein the injection power supply applies a pulse voltage to the source of the peak hold transistor;

a switch transistor, wherein a source of the switch transistor is connected to a drain of the peak hold transistor and a gate of the switch transistor is connected to receive a switch control signal;

a holding capacitor, wherein a first end of the holding capacitor is connected to a drain of the switch transistor and a second end of the holding capacitor is connected to ground;

a source follower transistor, wherein a gate of the source follower transistor is connected to the drain of the switch transistor and a drain of the source follower transistor is connected to the power supply; and a selection transistor, wherein a drain of the selection transistor is connected to a source of the source follower transistor, a source of the selection transistor is connected to an output line, and a gate of the selection transistor is coupled to receive a row selection signal.

7. The pixel circuit of the image sensor according to claim 6, wherein the reset transistor is an n-channel field effect transistor, the peak hold transistor and the switch transistor are p-channel field effect transistor, the source follower transistor and the selection transistor are n-channel field effect transistor.

8. A method of operating a pixel circuit of the image sensor according to claim 6, the method comprising:

maintaining the row selection signal to a first low voltage to keep the selection transistor at an off state;

maintaining a direct-current load control voltage to the gate of the load transistor to allow the peak hold transistor to perform source follower operation;

maintaining the switch control signal to a high voltage to keep the switch transistor off;

applying a positive pulse to the gate of the reset transistor to reset accumulated charges of the photodiode for one frame period;

setting the switch control signal to a second low voltage to turn the switch transistor on;

applying a first positive pulse to the source of a peak hold transistor to inject holes into the holding capacitor;

discharging excess charges through the peak hold transistor once the source of the peak hold transistor reaches a third low voltage after the first positive pulse;

putting the holding capacitor into a reset state to accumulate an integrated charges of the photodiode corresponding to an incident light from the gate of the peak hold transistor to the holding capacitor through the switch transistor for one frame period;

turning the switch transistor off and then turning the selection transistor on to read an integrated PH-Injection signal from the holding capacitor to the output line;

turning the selection transistor off followed by turning the switch transistor on to refresh the holding capacitor;

applying a second positive pulse to the source of the peak hold transistor to inject holes to refresh the peak hold transistor to operate as a refresh circuit by discharging excess holes, to store the charges corresponding to the output voltage of the photodiode during the second positive pulse period in the holding capacitor; and turning the switch transistor off and then turning the selection transistor on to read an PH-refresh signal from the holding capacitor to the output line.

9. The method of operating the pixel circuit of the image sensor of claim 8, wherein the photodiode generates charges corresponding to the incident light and is operable in both a linear region and a logarithmic region.

10. The method of operating the pixel circuit of the image sensor of claim 9, wherein if determined that one of the PH-injection signal and the PH-refresh signal is greater than a predetermined threshold, the PH-injection signal is selected in the logarithmic region to suppress flicker, and wherein if determined that one of the PH-injection signal and the PH-refresh signal is less than the predetermined threshold, the PH-refresh signal is selected in the linear region to suppress flicker.

* * * * *